(12) United States Patent
Kim

(10) Patent No.: US 7,318,980 B2
(45) Date of Patent: Jan. 15, 2008

(54) RECHARGEABLE BATTERY

(75) Inventor: Yong-Sam Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/086,739

(22) Filed: Mar. 23, 2005

(65) Prior Publication Data
US 2005/0214640 A1    Sep. 29, 2005

(30) Foreign Application Priority Data
Mar. 24, 2004    (KR) .................. 10-2004-0019950

(51) Int. Cl.
  *H01M 2/26*    (2006.01)
  *H01M 2/04*    (2006.01)
(52) U.S. Cl. .................. 429/211; 429/175; 429/164
(58) Field of Classification Search ............... None
  See application file for complete search history.

(56) References Cited

U.S. PATENT DOCUMENTS 3,732,124 A * 5/1973 Cailley .................. 429/94
4,554,227 A * 11/1985 Takagaki et al. ............. 429/178
5,006,426 A * 4/1991 Suzuki et al. .................. 429/94
5,521,021 A * 5/1996 Alexandres et al. .......... 429/54
6,182,361 B1 * 2/2001 Cox et al. .................. 29/888.1
6,899,973 B2 * 5/2005 Nakanishi et al. ............. 429/94
7,153,610 B2 * 12/2006 Kojima ........................ 429/237

FOREIGN PATENT DOCUMENTS

JP    2004-071266 A1    3/2004

* cited by examiner

*Primary Examiner*—John S. Maples
(74) *Attorney, Agent, or Firm*—H.C. Park & Associates, PLC

(57) ABSTRACT

A rechargeable battery comprises an electrode assembly that comprises a positive plate, a negative plate, and a separator interposed between those two plates. It also includes a container for the electrode assembly, a cap assembly fixed to the container to seal the container, and a collector plate coupled to the positive plate or the negative plate of the electrode assembly. The collector plate includes a plate-shaped body and at least two tabs that are integrally formed with the body to be coupled to the cap assembly.

9 Claims, 7 Drawing Sheets

RECHARGEABLE BATTERY

CROSS REFERENCE TO RELATED APPLICATION

This application claims priority to and the benefit of Korean Patent Application No. 10-2004-0019950, filed on Mar. 24, 2004, which is hereby incorporated by reference for all purposes as if fully set forth herein.

BACKGROUND OF THE INVENTION

1. Field of the Invention

The present invention relates to a rechargeable battery. In particular, the present invention relates to a structure that couples an external terminal of a cap assembly and an electrode assembly that are mounted inside a battery container.

2. Description of the Related Art

High-power rechargeable batteries for environmentally friendly motor vehicles and for slim and portable electronic devices have recently been developed. Non-aqueous electrolyte rechargeable batteries are often used in these applications. The positive plate and the negative plate of a non-aqueous electrolyte rechargeable battery generally comprise an alkaline metal such as lithium, and the container for the rechargeable battery is sealed so as to prevent the alkaline metal from reacting with moisture from the air.

A sealed rechargeable battery includes a container that has an opening at its upper end and an electrode assembly mounted inside the container that is immersed in an electrolyte. It also includes an external terminal fixed to the container to seal the battery, such as by a cap assembly with a positive terminal. A positive plate of the electrode assembly is connected to the cap assembly through a tab.

A rechargeable battery of the type mentioned above that connects the electrode assembly to the external terminal using only a single tab increases internal resistance when carrying the voltage generated from each region of the electrode assembly to the external terminal. Accordingly, it cannot transfer the current of the electrode assembly to the external terminal enough to maximize the battery characteristics. This makes this type of rechargeable battery unsuitable for use in high power motor-driven devices.

Furthermore, this type of rechargeable battery does not uniformly extract the voltage generated from each region of the electrode assembly. This causes voltage differences between a region where the electrode assembly is welded to the tab and other regions that are at a distance from the tab. Such a voltage difference increases the deterioration of the welded portion as charge and discharge steps are repeated, and also results in reduced power and lifespan of the battery. Such problems are especially serious in a battery for a motor-driven device which repeats the charge and discharge within a short time.

SUMMARY OF THE INVENTION

This invention provides a rechargeable battery that can minimize internal resistance when carrying the voltage generated from the electrode assembly to the cap assembly through the collector plate. It also provides a more stable contact between the collector plate and the electrode assembly. The improved contact permits it to collect the current from the electrode assembly more efficiently. This allows the rechargeable battery according to the present invention to maximize its power generating characteristics and the lifespan of the battery by minimizing the electric potential difference due to a single tab weld. Therefore, it can be used as the power source for high load motor driven devices such as hybrid electric vehicles, electric vehicles, wireless vacuum cleaners, motorbikes, or motor scooters.

Additional features of the invention will be set forth in the description which follows, and in part will be apparent from the description, or may be learned by practice of the invention.

The present invention discloses a rechargeable battery that comprises an electrode assembly including a positive plate, a negative plate, and a separator interposed between those two plates. The battery also includes a container for the electrode assembly, a cap assembly fixed to the container to seal the container, and a collector plate that is electrically connected to the positive plate or the negative plate of the electrode assembly. The collector plate includes a plate-shaped body and at least two tabs that are integrally formed with the body to be coupled to the cap assembly.

The present invention also discloses a method of fabricating a collector plate for a rechargeable battery that electrically connects an electrode assembly with a cap assembly comprising first cutting a portion of a body with a predetermined shape. The cut portion is bent and formed into a tab as an integral part of the body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
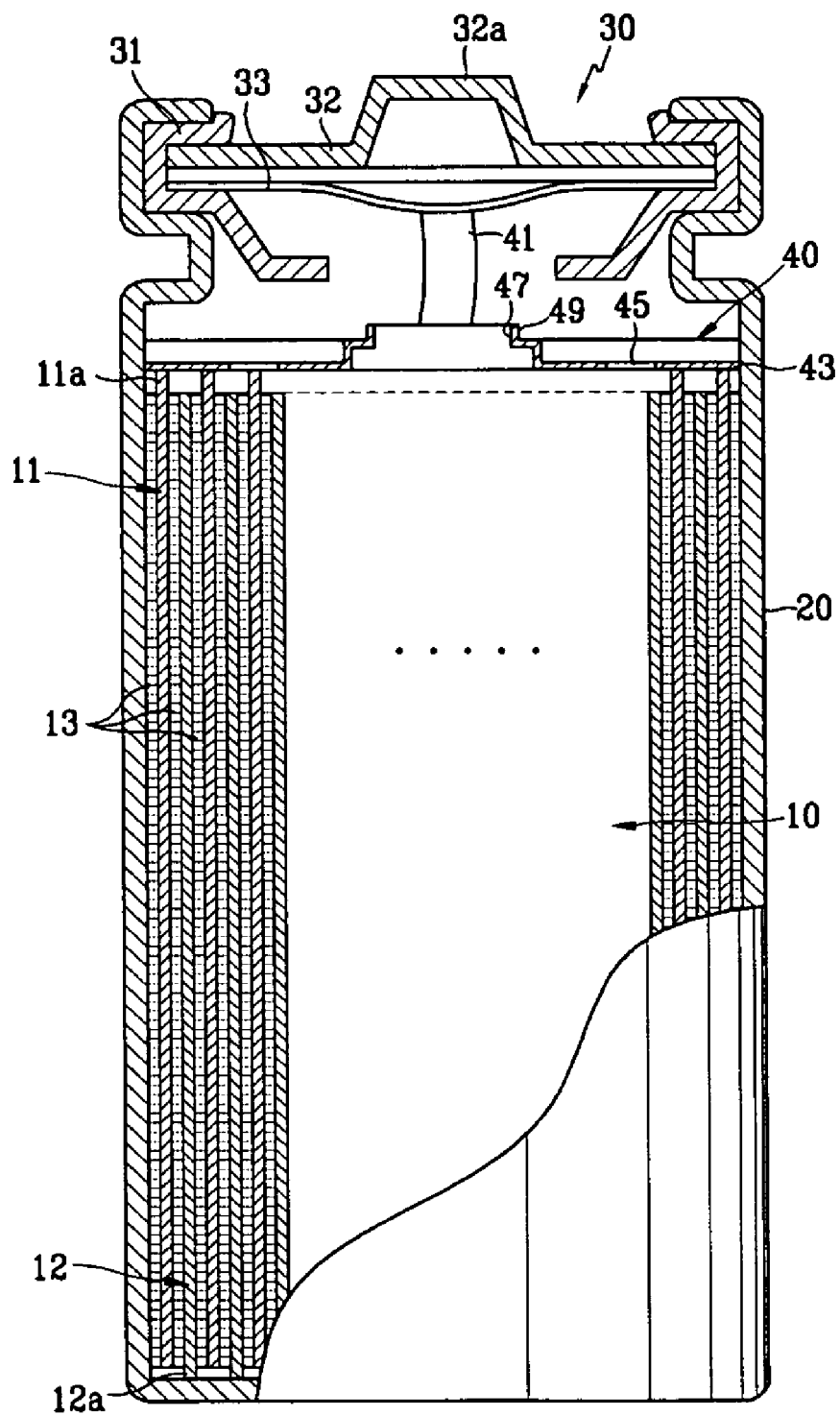
FIG. 1 is a partial cross-sectional view of a rechargeable battery according to the first exemplary embodiment of the present invention.
Figure 2:
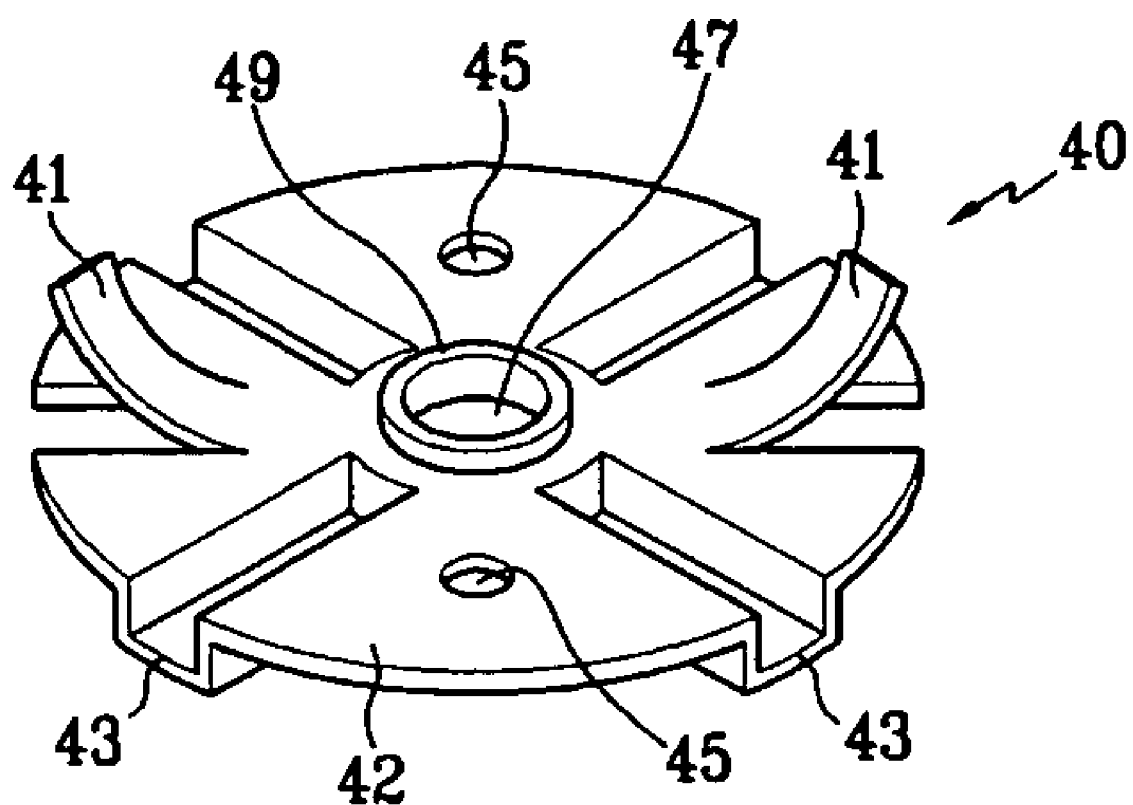
FIG. 2 is a perspective view of a collector plate of the rechargeable battery according to the first exemplary embodiment of the present invention.

FIG. 1 is a partial cross-sectional view of a rechargeable battery according to the first exemplary embodiment of the present invention, and FIG. 2 is a perspective view of a collector plate of the rechargeable battery according to the first exemplary embodiment of the present invention.

As shown in FIG. 1, the rechargeable battery comprises an electrode assembly 10 including a positive plate 11, a negative plate 12, and a separator 13 interposed between those two plates. In addition, the battery includes a container 20 for holding the electrode assembly 10 together with an electrolyte, a cap assembly 30 mounted to the opening of the container 20 through a gasket 31 to close off and seal the container 20, a collector plate 40 that is coupled to a collector of a positive plate 11 of the electrode assembly 10, and a plurality of tabs 41 projecting toward the cap assembly 30 from the collector plate 40 to be fixed to the cap assembly 30.

The container 20 is made of conductive metal such as aluminum, aluminum alloy, and steel that is plated with nickel aluminum, and is formed in a cylindrical, hexagonal and other shapes, for example, that have an inner space where the electrode assembly 10 can be placed.

The electrode assembly 10 comprises the separator 13 that is disposed between the positive plate 11 and the negative plate 12, which are coated with the corresponding active material and then stacked or rolled into a jellyroll structure. FIG. 1 shows a rechargeable battery where the container 20 has a cylindrical shape and the electrode assembly 10 has a jellyroll configuration.

At the lower end of the negative plate 12 of the electrode assembly 10, there is an uncoated region 12a of the collector of the negative plate 12 that is not coated with the negative active material as shown in FIG. 1. The uncoated region contacts the container 20. Similarly, at the edge of the collector in the upper end of the positive plate 11, there is an uncoated region 11a that is not coated with the positive active material. The uncoated region 11a is arranged to electrically connect to the collector plate 40.

The cap assembly 30 includes a cap plate 32 that has an external terminal 32a, and a gasket 31 for insulating the cap plate 32 from the container 20. The cap assembly 30 can further include a vent plate 33 which opens at a set pressure to discharge high pressure gas, thereby preventing the explosion of the battery. The vent plate 33 is not limited to the structure shown in the drawings, and it can be varied to any structure that can short-circuit the electrical connection between the external terminal 32a and the electrode assembly 10 through the tab 41 at a set pressure.

As shown in FIG. 2, the collector plate 40 includes a disk-shaped body 42 and a plurality of tabs 41 integrally projecting toward the cap assembly 30 (for FIG. 1) from the body 42. One end of the tabs 41 can be fixed to the cap assembly. The shape of the body 42 is not limited to the disk shape, and it can be a triangle, a square or a polygonal shape.

One end of the tabs 41 is fixed to the vent plate 33 of the cap assembly 30 to electrically connect the collector plate 40 and the cap assembly 30. The tab 41 is formed by cutting a portion of the body 42 and bending the resulting tab away from the body 42 toward the cap assembly 30. This allows the tabs 41 to be an integral part of the body 42. At least two tabs must be formed to enlarge the contact area between the collector plate 40 and the cap assembly 30, as shown in FIG. 2.

The body 42 of the collector plate 40 further includes at least one through hole 45 to allow the easy pouring of electrolyte into the container 20 from outside of the collector plate 40.

Furthermore, the body 42 has a center hole 47 at its center portion, and a gripping portion 49 projected from the edge of the center hole. The gripping portion 49 plays a role in enabling an apparatus to position the collector plate 40 at a precise position of the positive plate 11 when the collector plate 40 is welded to the positive plate 11.

Figure 3:
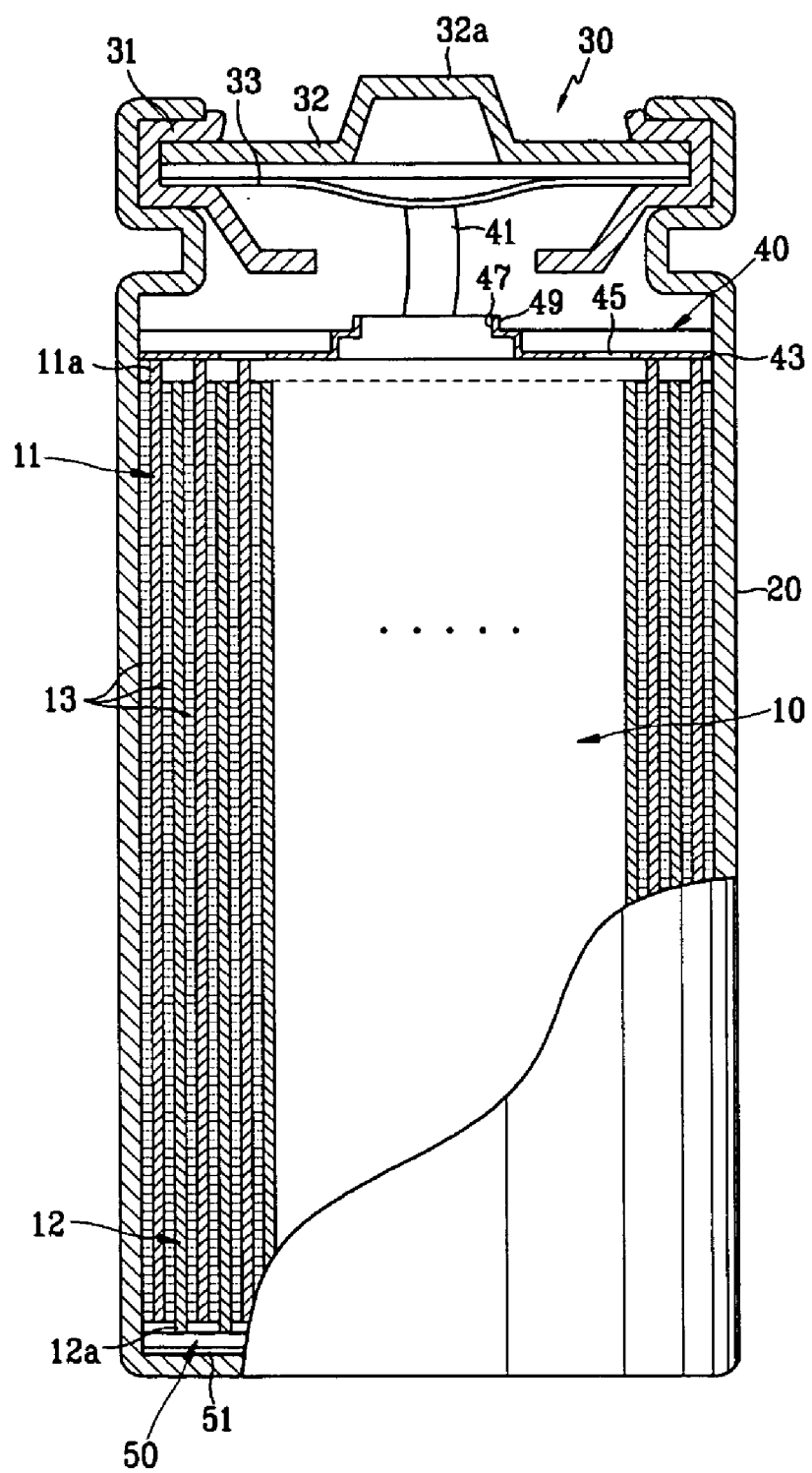
FIG. 3 is a partial cross-sectional view of a rechargeable battery according to the second exemplary embodiment of the present invention.

In the second exemplary embodiment of the invention as shown in FIG. 3, an optional negative collector plate 50 can be arranged between the negative plate 12 and the container 20 to contact the uncoated region 12a of the negative plate 12 and the container 20. This negative collector plate 50 can achieve the same effects as those of the groove 43 of the collector plate 40 as described in the first embodiment of FIG. 1 and FIG. 2. The structure of the negative collector plate 50 is the same as that of the positive collector plate 40, except that it does not have tabs 41. When the negative collector plate 50 is mounted inside the container 20, the groove 51 contacts the bottom surface of the container 20, and is fixed and is electrically connected to the container 20 by resistance welding.

Figure 4:
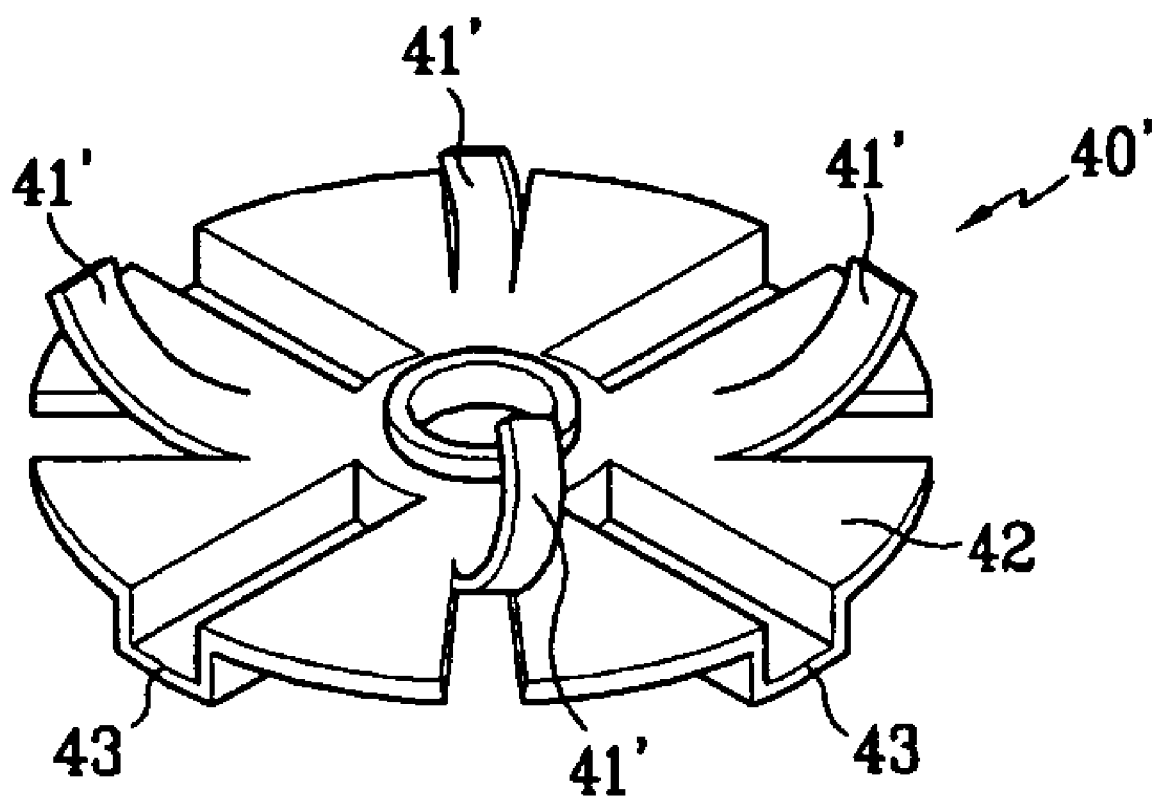
FIG. 4 is a perspective view of a collector plate of the rechargeable battery according to the third exemplary embodiment of the present invention.

While FIG. 2 shows a collector plate 40 that has two tabs 41, FIG. 4 shows a collector plate 40' that has four tabs 41'. The number of the tabs 41, 41' is not limited to the above description. Where a plurality of tabs 41 are provided on the collector plate 40, they should preferably be arranged in a radial shape on the body 42, considering the manufacturing efficiency and the symmetrical shape of the collector plate.

Figure 5:
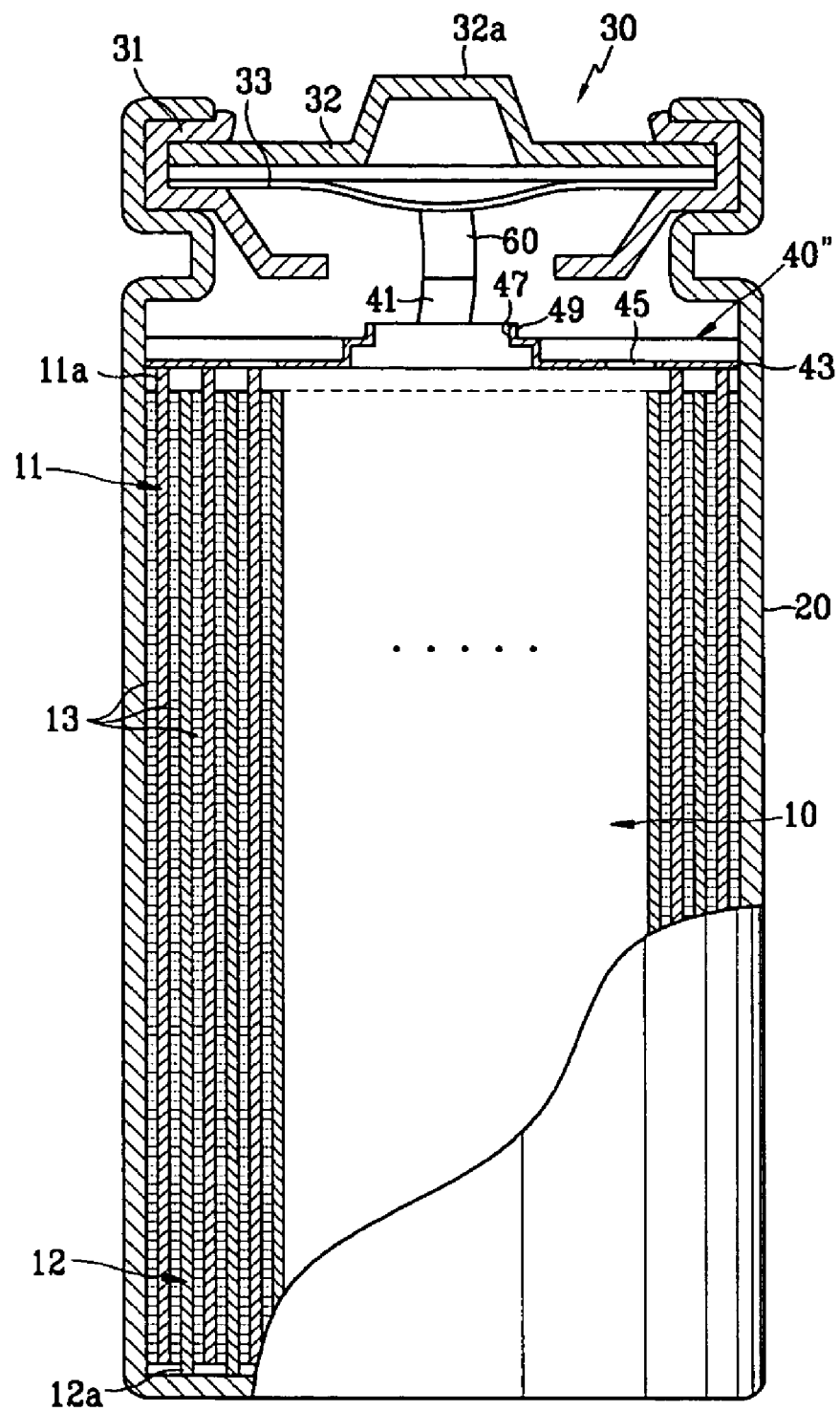
FIG. 5 is a partial cross-sectional view of a rechargeable battery according to the fourth exemplary embodiment of the present invention.
Figure 6:
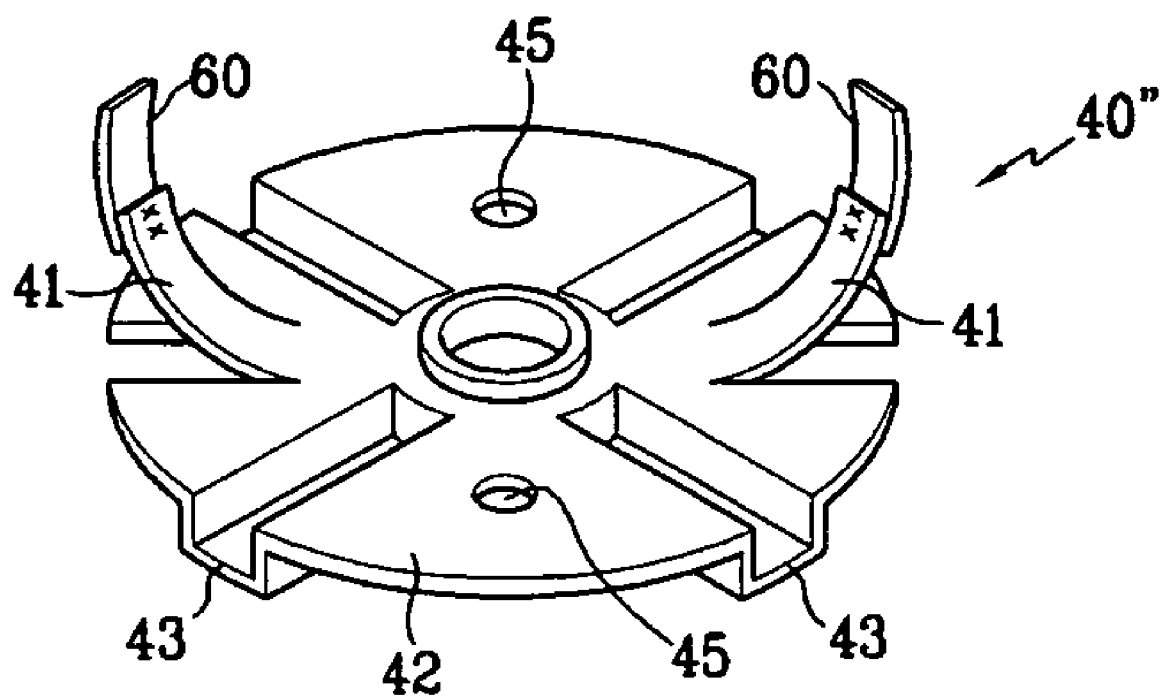
FIG. 6 is a perspective view of a collector plate of the rechargeable battery according to the fourth exemplary embodiment of the present invention.

As shown in FIG. 5 and FIG. 6, where the tabs 41 provided on the collector plate 40" are too short to connect the collector plate 40" and the cap assembly 30 by itself, an auxiliary tab 60 can further be provided between the tabs 41 and the cap assembly 30. The auxiliary tab 60 can be separately manufactured and then coupled to the tabs 41 by various methods, including welding.

Figure 7A:
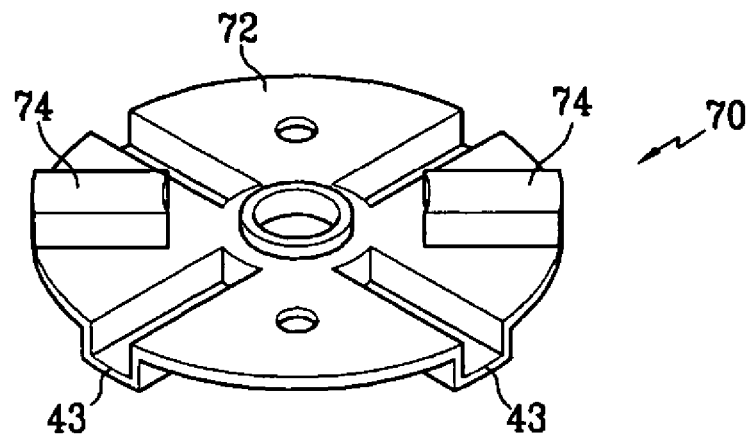
FIG. 7A and FIG. 7B are perspective views of collector plates of the rechargeable battery according to the fifth exemplary embodiment of the present invention.
Figure 7B:
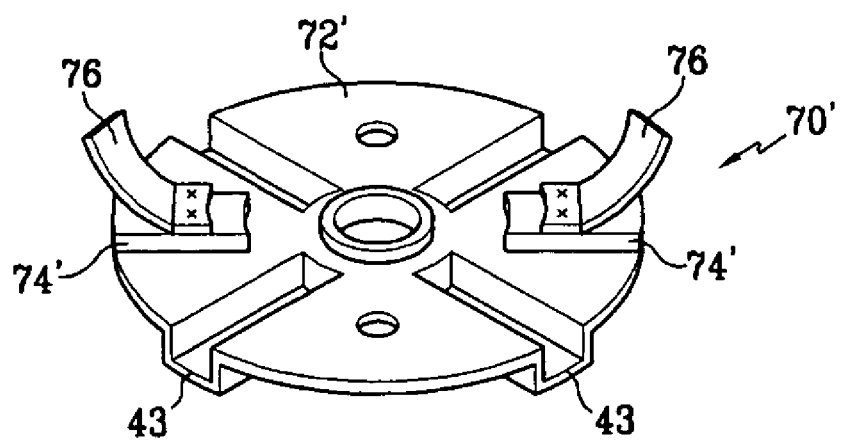

FIG. 7A and FIG. 7B are perspective views of collector plates 70, 70' according to another embodiment of the present invention. The collector plates 70, 70' have multiple tabs 74, 74' on the bodies 72, 72' that have a simple projected shape, rather than the previously described tabs with the cut and bended shape from the body 42.

FIG. 7A shows the collector plate 70 where the tabs 74 that project from the body 72 are welded directly to the cap assembly 30. FIG. 7B shows the collector plate 70' where auxiliary tabs 76 are additionally attached to the tabs 74' projected from the body 72' and they are welded to the cap assembly 30.

The lower ends of the bodies 42, 72, 72' of the collector plates 40, 40', 40", 70, 70' are coupled to the uncoated region 11a of the positive plate 11. Furthermore, grooves 43 projected toward the electrode assembly 10 can be formed on the bodies 42, 72, 72' to facilitate contact with the uncoated region 11a of the positive plate 11.

The groove 43 can be formed by a beading process of the bodies 42, 72, 72', and a plurality of grooves 43 are provided and arranged radially on the bodies 42, 72, 72'. For example, as shown in the drawings, four grooves 43 are arranged in a cross shape on the bodies 42, 72, 72', where each of tabs 41, 41', 74, 74' can be placed between the grooves 43.

When fabricating the rechargeable battery with the structure mentioned above, the collector plate 40 is placed on the upper surface of the electrode assembly 10 which is mounted inside the container 20. The groove 43 of the collector plate 40 is coupled to the uncoated region 11a of the positive plate 11 by laser welding to couple the collector plate 40 and the positive plate 11.

In addition, the tabs 41 provided on the collector plate 40 are coupled to the vent plate 33 of the cap assembly 30 by laser welding, resistance welding, or ultrasonic welding.

In the rechargeable battery with the structure mentioned above, the tabs 41 can enlarge the contact area between the collector plate 40 and the cap assembly 30, thereby minimizing internal resistance of the battery when carrying the voltage generated from the electrode assembly 10 to the cap assembly 30 through the collector plate 40. Therefore, the rechargeable battery according to the present invention can maximize its high power generating characteristics.

Table 1 gives comparison data between the present invention with multiple tabs provided on a collector plate (Example) and the conventional art with a single tab provided on a collector plate (Comparative Example).

As shown in Table 1, the collector plate with multiple tabs can shorten the path of the current collected from the electrode plate to the terminal, which decreases the resistance of the collector plate to thereby increase the collecting efficiency.

TABLE 1

|  | Conductivity ($\Omega^{-1}$ cm$^{-1}$) | Path (mm) | Thickness (mm) | Width (mm) | Resistance (m$\Omega$) |
| --- | --- | --- | --- | --- | --- |
| Comparative Example | $3.40 \times 10^{-6}$ | 59.88 | 0.3 | 10 | 0.67864 |
| Example | $3.40 \times 10^{-6}$ | 35.08 | 0.3 | 10 | 0.39757 |

The rechargeable battery with the structure mentioned above provides a more stable contact between the collector plate 40 and the uncoated region 11a of the positive plate 11 by using the groove 43. The more stable contact permits the battery to collect the current from the electrode assembly 10 more efficiently. Accordingly, the rechargeable battery of the present invention can prevent the loss of power and reduction of life span by minimizing the electric potential difference inside the electrode assembly 10.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   an electrode assembly including a positive plate, a negative plate, and a separator between the positive plate and the negative plate;
   a container housing the electrode assembly;
   a cap assembly sealing the container; and
   a collector plate coupled to the positive plate or the negative plate,
   wherein the collector plate comprises:
      a single body having at least two tabs, which are made by cutting and bending the body inward from a circumference, wherein the at least two tabs bend towards the cap assembly and each tab extends from an inward portion of the body, and the tabs are arranged in a radial shape on the body; and
      a groove having a substantially flat lower surface and side walls extending substantially perpendicular from the substantially flat lower surface,
      wherein the groove is coupled with the corresponding positive plate or negative plate.

2. The rechargeable battery of claim 1, wherein the tabs are coupled to the cap assembly by laser welding, resistance welding or ultrasonic welding.

3. The rechargeable battery of claim 1, further comprising an auxiliary tab coupling a tab to the cap assembly.

4. The rechargeable battery of claim 1, wherein grooves are arranged in a radial shape on the body.

5. The rechargeable battery of claim 4, wherein the grooves are arranged in a cross shape on the body.

6. The rechargeable battery of claim 1, wherein the tabs project from the body.

7. The rechargeable battery of claim 1, wherein the rechargeable battery has a cylindrical shape.

8. A motor-driven device comprising the battery of claim 1.

9. The rechargeable battery of claim 1, wherein the tabs are integrally formed with the body.

* * * * *